United States Patent [19]
Jones

[11] Patent Number: 6,115,358
[45] Date of Patent: Sep. 5, 2000

[54] CONTROLLING THE FLOW OF ATM CELLS IN AN ATM NETWORK

[75] Inventor: Trevor Jones, Maldon, United Kingdom

[73] Assignee: General Data Comm, Inc., Middlebury, Conn.

[21] Appl. No.: 08/973,442

[22] PCT Filed: Jun. 5, 1996

[86] PCT No.: PCT/US96/08906

§ 371 Date: Dec. 4, 1997

§ 102(e) Date: Dec. 4, 1997

[87] PCT Pub. No.: WO96/39759

PCT Pub. Date: Dec. 12, 1996

[30] Foreign Application Priority Data

Jun. 5, 1995 [GB] United Kingdom ............... 9511319

[51] Int. Cl.[7] ............................ H04J 1/16; H04J 3/14
[52] U.S. Cl. ................ 370/232; 370/253; 370/395; 370/465
[58] Field of Search ................................ 370/230, 231, 370/232, 233, 234, 235, 236, 248, 249, 252, 395, 465, 253

[56] References Cited

U.S. PATENT DOCUMENTS

| | | |
|---|---|---|
| 5,400,329 | 3/1995 | Tokura et al. ............... 370/231 |
| 5,515,359 | 5/1996 | Zheng ............... 370/230 |
| 5,787,071 | 7/1998 | Basso et al. ............... 370/231 |
| 5,889,761 | 3/1999 | Yamato ............... 370/231 |
| 5,940,370 | 8/1999 | Curtis et al. ............... 370/231 |

*Primary Examiner*—Ricky Ngo
*Attorney, Agent, or Firm*—David P. Gordon; David S. Jacobson; Thomas A. Gallagher

[57] ABSTRACT

A method of controlling flow of ATM cells by signalling to the source of cells on a connection to reduce transmission rate when congestion occurs in a switch in an ATM network. The step of signalling being carried out by way of inserting into the Resource Management cells a new Explicit rate (ER) value for the connection at a given point in the network. The ER value being obtained is a function of the number of Available Bit Rate (ABR) cells output from the buffer in an interval. The method includes determining the number of ABR Virtual Containers (VCs) with more than a predetermined number of cells stored, determining the number of cells on the connection stored, determining the total number of cells currently stored and the remaining capacity of the buffer, and calculating the ER value from a given formula.

18 Claims, 2 Drawing Sheets

CONTROLLING THE FLOW OF ATM CELLS IN AN ATM NETWORK

FIELD OF THE INVENTION

This invention relates to a method of controlling the flow of ATM cells in an ATM network, and to an ATM network switch in which the method is carried out.

BACKGROUND TO THE INVENTION

The ABR (Available Bit Rate) service in Asynchronous Transfer Mode (ATM) networks is intended to make the best use of remaining capacity after higher priority services such as CBR (Constant Bit Rate) and VBR (Variable Bit Rate) have been provided for. To achieve this, special ATM cells known as Resource Management or Rm cells are sent from the source, through the destination and back to the source to provide information on the congestion level in the switches in the path. This is used by the source to modify its transmission rate, the objective being to utilize link capacity fully while not losing any cells as a result of congestion. An Explicit Rate (ER) parameter is set in the Rm cells passing through the switch in the forwards and backwards directions, the ER being reduced as congestion occurs down to the Minimum Cell Rate (MCR) value to reduce the rate at which the source sends.

In addition, the Message Type field in the Rm cell includes Congestion Indication (CI) and No Increase (NI) bits which may be set respectively to signal to the source that a predetermined decrease in the transmission rate should be effected and that the source should not automatically increase the send rate—it is normally arranged to keep pushing the send rate up again after the ER has signalled a reduction, in order to ensure that the rate is not permanently depressed. The switch may generate a backwards Rm cell (known as BECN) to the source to indicate congestion, the rate of these being limited to 10 per second per connection.

The Explicit Rate or ER parameter thus dictates the maximum rate at which the source is allowed to send in cells per second. MCR dictates the minimum rate at which a source may always send. ER must therefore not be set less than MCR.

SUMMARY OF THE INVENTION

The present invention provides a method of controlling the flow of ATM cells in an ATM network, comprising signalling to the source of cells on a connection to reduce the transmission rate when congestion occurs in a switch in the network, the signalling being carried out by way of insertion into Resource Management Rm cells of a new Explicit Rate (ER) value for the connection, wherein the ER value is obtained at a given point in the network for each cell arriving at said point, said point including a buffer for the cells, by:

counting the number of ABR cells output from the buffer within a predetermined time interval to give an ABR Output Bandwidth value (AOB); and calculating an ER value as a function of AOB.

Preferably, the method comprises:

determining the Number $N_{act}$ of ABR VCs with more than a predetermined number of cells stored in the buffer;

determining the number of cells VcCnt on the connection stored in the buffer;

determining the total number of cells TSC currently stored in the buffer and the remaining capacity BS of the buffer; and calculating the ER value as a function of AOB, $N_{act}$, VcCnt, TSC and BS.

More preferably, the ER value is calculated from the following formula:

$$ER = \frac{AOB}{N_{act}} \times \left(1 - \frac{VcCnt}{MAX}\right) \times \left(1 - \frac{TSC}{BS + K_{er}}\right),$$

wherein MAX is a predetermined function reflecting the delay from the source of ABR cells in the network to the said point, and $K_{er}$ is a predetermined offset value which determines the occupancy of the buffer for the VC on which the cell is being transmitted.

Preferably, $N_{act}$ is a value which is incremented when a cell is written into the buffer on a VC having a VcCnt of less than 16, and the formula is:

$$ER = \frac{16 \times AOB}{N_{act}} \times \left(1 - \frac{VcCnt}{MAX}\right) \times \left(1 - \frac{TSC}{BS + K_{er}}\right)$$

Preferably, the method includes multiplying the number of ABR cells output during the predetermined period by a predetermined constant to give the AOB value.

The invention further provides an ATM network switch comprising a buffer means for buffering the flow of ATM cells and means for calculating the Explicit Rate (ER) value for a connection thereon, the calculating means comprising:

means for counting the number of ABR cells output from the buffer within a predetermined time interval to give an ABR Output Bandwidth value (AOB); and means for calculating an ER value as a function of AOB.

Preferably the switch comprises:

means for determining the Number $N_{act}$ of ABR VCs with more than a predetermined number of cells stored in the buffer; means for determining the number of cells VcCnt stored in the buffer for the cell's VC;

means for determining the total number of cells TSC currently stored in the buffer and the remaining capacity BS of the buffer;

and wherein the calculating means is arranged to calculate the ER value as a function of AOB, $N_{act}$, VcCnt, TSC and BS.

More preferably, the switch comprises means for storing for each VC established through the switch an offset value $K_{er}$ which determines the maximum occupancy of the buffer for the connection and a value MAX which is a predetermined function reflecting the delay from the source of ABR cells in the network to the switch, and the calculating means is arranged to calculate the ER value according to the following formula:

$$ER = \frac{AOB}{N_{act}} \times \left(1 - \frac{VcCnt}{MAX}\right) \times \left(1 - \frac{TSC}{BS + K_{er}}\right).$$

Another aspect of the invention provides an ATM network switch comprising transmitting means and receiving means associated with an external data link to the switch, and memory means connected to the transmitting means and to the receiving means, and wherein the transmitting means is arranged to write to the memory means congestion data contained in Resource Management (Rm) cells being transmitted by the transmitting means and the receiving means is arranged to read the said data from the memory means and to modify in accordance with the said data congestion data contained in reverse Rm cells arriving at the receiving means from the external data link.

The congestion data preferably comprises the ER, NI and CI fields in the Rm cell, and may be modified in the reverse Rm cells so as to OR the NI and CI fields with the values from the memory means and to set the reverse Rm ER value as the MCR or the lowest of the new and old ER values if this is greater than the MCR value.

BRIEF DESCRIPTION OF THE DRAWINGS

In the drawings, which illustrate an exemplary embodiment of the invention.

DETAILED DESCRIPTION OF THE ILLUSTRATED EMBODIMENT

Figure 1A:
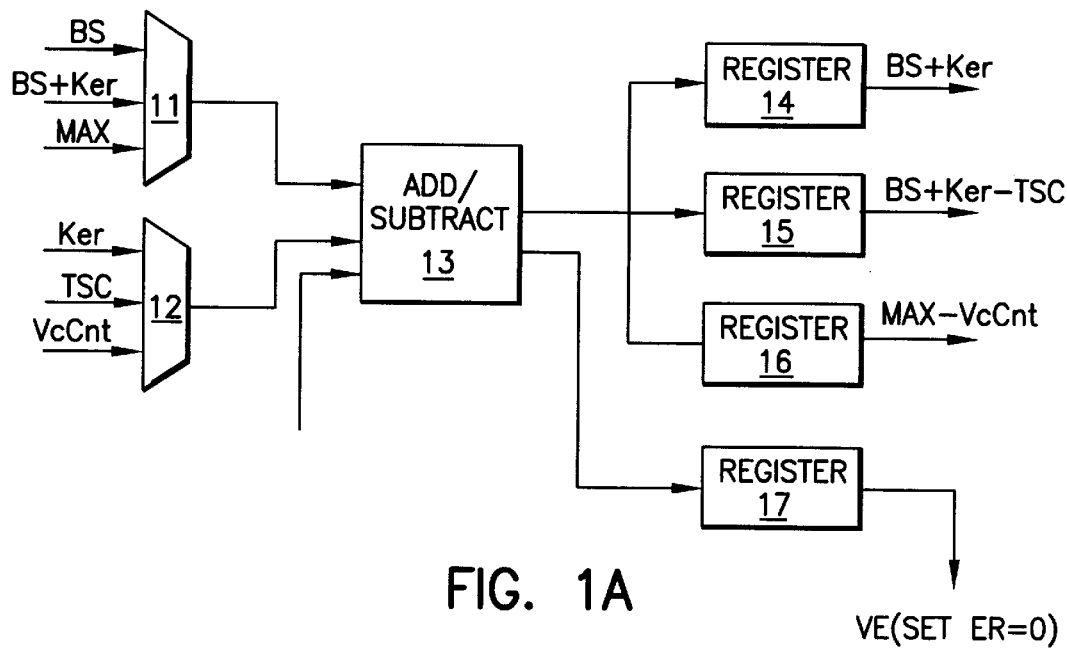
FIG. 1 is a diagrammatic representation of the ER calculating means in an ATM network switch.
Figure 1B:
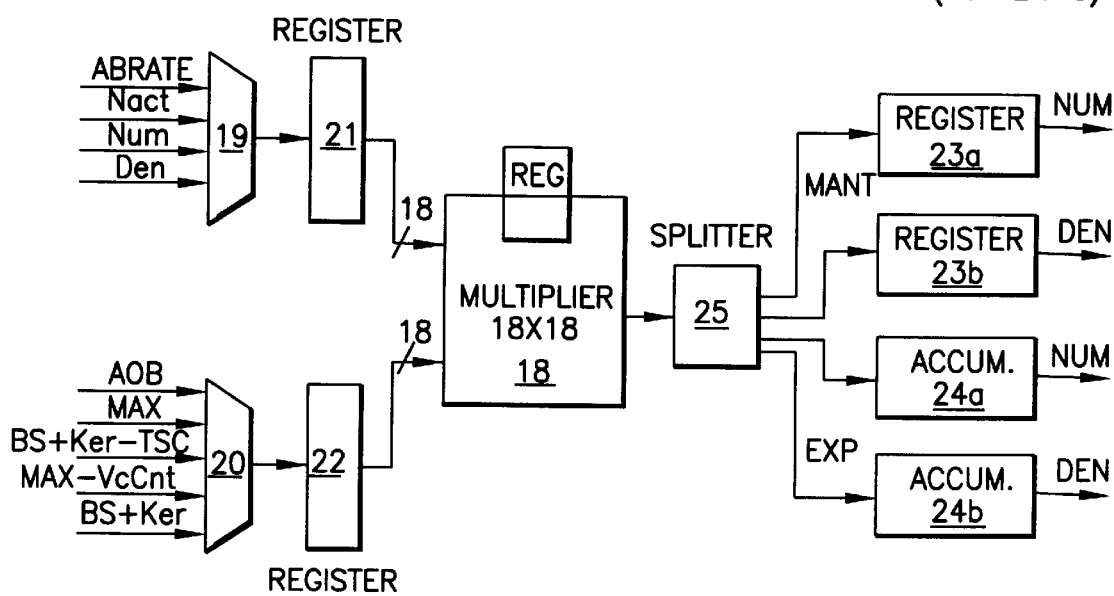
Figure 1C:
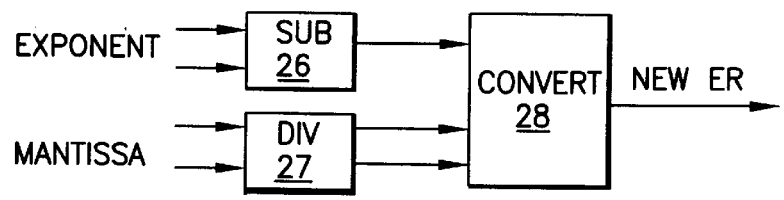

Referring to FIG. 1, the formula is first translated in to the form:

$$ER = \frac{4 \times AOB \times ABRATE \times (MAX - VcCnt) \times (BS + K_{er} - TSC)}{N_{act} \times MAX \times (BS + K_{er})}$$

where ABRATE is a factor which converts AOB, the number of cells in a predetermined arbitrary period, into a uniform rate of cells per unit time this is because divisions are difficult to implement in hardware, and this form requires only one division operation, with the numerator and denominator being calculated separately before the division is performed. (In the formula shown above, a factor of 4 is used because $N_{act}$ is divided by four in the implementation described to reduce the size of the numbers to be accommodated in an 18×18 multiplier.)

Multiplexers 11 and 12 (FIG. 1a) pass the successive inputs to the adder/subtracter 13. First the Buffer Space BS and the offset $K_{er}$ are added together and the result stored in a first register 14. The Total of Stored Cells TSC is then supplied to the adder/subtracter 13 via multiplexer 12 and the BS+K result is read out of register 14 and returned to the adder/subtracter 13 via multiplexer 11, a subtraction operation yielding BS+K−TSC, which is stored in register 15. Finally, the value MAX is supplied to the adder/subtracter 13 via multiplexer 11 and the VcCnt value is supplied via multiplexer 12, and another subtraction operation is performed to yield MAX−VcCnt, which is stored in register 16. If the result of either subtraction is negative, a flag is stored in register 17, the flag signalling that ER is to be set to zero.

Referring back to the translated formula shown above, the multiplication operations are carried out in the second part of the mechanism, illustrated in FIG. 1b. The results of the addition and subtractions are supplied to the multiplier 18 via multiplexers 19 and 20 via holding registers 21 and 22. Since the products of the various numerator and denominator parameters lead potentially to 68 bit values, the calculation is simplified by treating the numbers as powers of two, with an 18 bit mantissa and 7 bit exponent. The splitter 25 receives the 36-bit numbers from the multiplier and converts the numbers to 18/7 format by left-justifying all results, using the full 18 bits for the number, even if a negative exponent results, to ensure a constant resolution. After each multiplication, the resulting mantissa is passed back to the relevant one of the multiplexers 19 and 20 until the full calculation is complete, when the result is stored in registers 23a and 23b for the mantissas. The exponents are accumulated in accumulators 24a and 24b, these being reset to zero at the beginning of each calculation cycle. The mantissas are then passed to divider 27 while the exponents pass to subtracter 26. Converter 28 outputs the results of these calculations as a 9 bit mantissa with a 5 bit exponent, which matches the format of the cell rates in the Rm cell.

Figure 2:
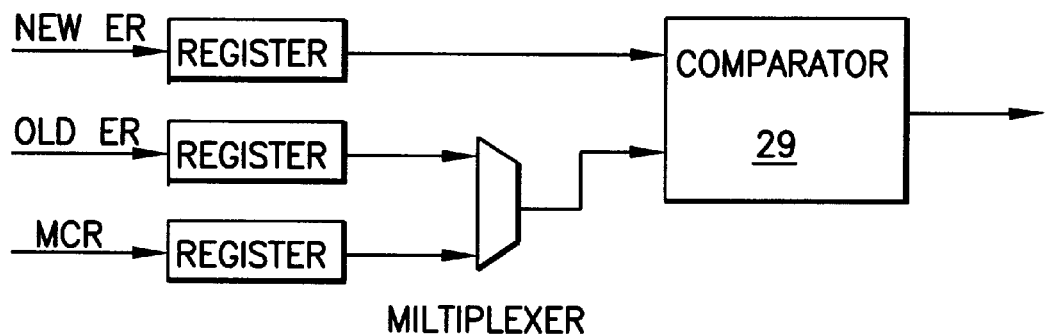
FIG. 2 is a diagrammatic representation of further comparison means.

FIG. 2 shows the next stage in which the newly-calculated ER is compared in turn with the old ER value and the MCR value from the Rm cell, the comparator 29 performing the following:

--- if NewER < MCR set ERout = MCR
    else, if NewER < OldER
    set ERout = NewER
    else
    set ERout = OldER.

---

FIG. 2 represents the situation at the receive side of the switch. In the case of the transmit side of the switch, the comparison is carried out additionally with the ER value calculated at the receive side. The ER value is transmitted from the receiver to the transmitter across the switch fabric by writing it to the MCR field in the cell. At the transmitter, the ER value is read out again, and replaced by the MCR value which is stored in the routing table in the switch when the VC is set up.

Figure 3:
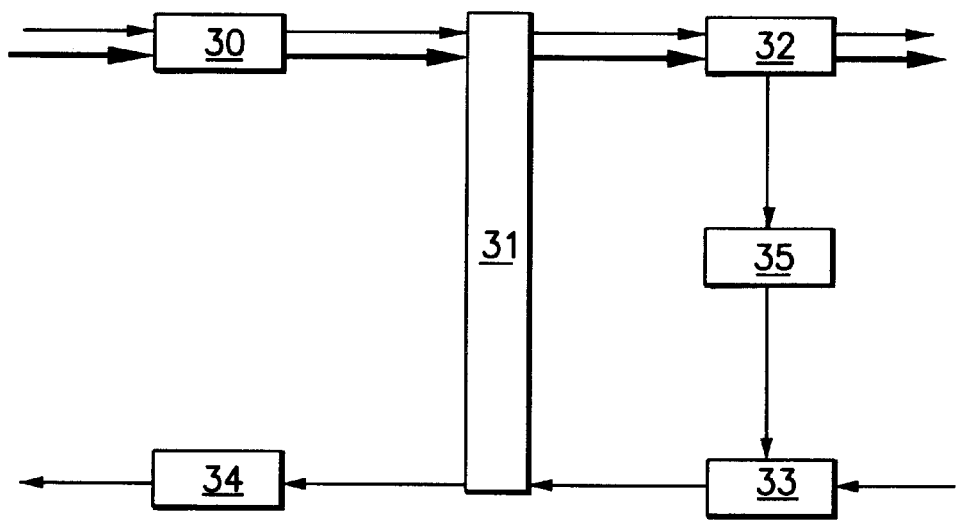
FIG. 3 is a diagrammatic representation of the ATM switch.

FIG. 3 illustrates in simplified form an ATM switch having a receiver 30 receiving cells on a connection from its source, a switch fabric 31, and a transmitter 32 passing the cells on to the next stage of the connection. A second receiver 33 receives Rm cells being returned to the source from the destination, a second transmitter 34 passing the cells on to the next stage back towards the source. A dual-ported RAM 35 is connected to the transmitter 32 and to the second receiver 33. It will be appreciated that connections may be configured with a source at each end so that forward and backward Rm cells will flow through each link to the switch.

When a forward data cell is received by the receiver 30, the state of congestion is assessed in the manner described in our co-pending application GDC-082PCT filed on even date herewith. If the EFCI Threshold has been reached, then:

for EFCI switch behavior, the EFCI bit is set in all user data cells, and when a Rm cell arrives, the CI or NI bits are used according to programmable options (per connection);

for ER switch behavior, action is only taken for Rm cells (no EFCI bits are set). The new ER is calculated and placed in the cell (if less than the existing ER and more than MCR), and CI or NI bits are optionally set. If the receiver 30 is congested, then an internal code is set in the ATM cell for the transmitter 32 to act on.

The transmitter 32 performs the same behavior as the receiver 30, but also with the option of writing ER, CI and NI data to the dual-ported RAM 35.

The switch can function with two alternative modes: simple, in which the new ER value is written to the cell for forward transmission, the changed ER then being signalled back to the source from the destination; or more complex, in which the cell is passed onwards or forwards with the old ER value unchanged, the test establishing the lowest value of ER to be written to the DPRAM 35. In the receiver 33 the ER value stored is written in to the next cell only if it is lower than the existing value in the cell. If there is no congestion, the maximum possible value of ER is put into the DPRAM so that the backward ER in the backward cells is not changed.

What is claimed is:

1. A method of controlling the flow of ATM cells in an ATM network, comprising signalling to the source of cells on a connection to reduce its transmission rate when congestion occurs in a switch in the network, the signalling being carried out by way of insertion into Resource Management Rm cells of a new Explicit Rate (ER) value for the connection, wherein the ER value is obtained at a given point in the network for each cell arriving at said point, said point including a buffer for the cells, by:

counting the number of ABR cells output from the buffer within a predetermined time interval to give an ABR Output Bandwidth value (AOB); and calculating an ER value as a function of AOB.

2. A method according to claim 1, comprising:

determining the Number $N_{act}$ of ABR VCs with more than a predetermined number of cells stored in the buffer;

determining the number of cells VcCnt on the connection stored in the buffer;

determining the total number of cells TSC currently stored in the buffer and the remaining capacity BS of the buffer; and calculating the ER value as a function of AOB, $N_{act}$, VcCnt, TSC and BS.

3. A method according to claim 2, wherein the ER value is calculated from the following formula:

$$ER = \frac{AOB}{N_{act}} \times \left(1 - \frac{VcCnt}{MAX}\right) \times \left(1 - \frac{TSC}{BS + K_{er}}\right),$$

wherein MAX is a predetermined function reflecting the delay from the source of ABR cells in the network to the said point, and $K_{er}$ is a predetermined offset value which determines the occupancy of the buffer for the VC on which the cell is being transmitted.

4. A method according to claim 3, wherein Nact is a value which is incremented when a cell is written into the buffer on a VC having a VcCnt of less than 16, and the formula is:

$$ER = \frac{16 \times AOB}{N_{act}} \times \left(1 - \frac{VcCnt}{MAX}\right) \times \left(1 - \frac{TSC}{BS + K_{er}}\right).$$

5. A method according to claim 1, comprising multiplying the number of ABR cells output during the predetermined period by a predetermined constant to give the AOB value.

6. An ATM network switch comprising a buffer means for buffering the flow of ATM cells and means for calculating an Explicit Rate (ER) value for a connection thereon, the calculating means comprising:

means for counting the number of ABR cells output from the buffer within a predetermined time interval to give an ABR Output Bandwidth value (AOB); and means for calculating an ER value as a function of AOB.

7. A switch according to claim 6, comprising means for determining the Number $N_{act}$ of ABR VCs with more than a predetermined number of cells stored in the buffer;

means for determining the number of cells VcCnt stored in the buffer for the cell's VC; and means for determining the total number of cells TSC currently stored in the buffer and the remaining capacity BS of the buffer;

and wherein the calculating means is arranged to calculate the ER value as a function of AOB, $N_{act}$, VcCnt, TSC and BS.

8. A switch according to claim 7, comprising means for storing for each VC established through the switch an offset value $K_{er}$ which determines the maximum occupancy of the buffer for the connection and a value MAX which is a predetermined function reflecting the delay from the source of ABR cells in the network to the switch, and wherein the calculating means is arranged to calculate the ER value according to the following formula:

$$ER = \frac{AOB}{N_{act}} \times \left(1 - \frac{VcCnt}{MAX}\right) \times \left(1 - \frac{TSC}{BS + K_{er}}\right).$$

9. A switch according to claim 8, wherein $N_{act}$ is a value which is incremented when a cell is written into the buffer on a VC having a VcCnt of less than 16, and the formula is:

$$ER = \frac{16 \times AOB}{N_{act}} \times \left(1 - \frac{VcCnt}{MAX}\right) \times \left(1 - \frac{TSC}{BS + K_{er}}\right).$$

10. A switch according to claims 6, wherein the calculating means comprises means for multiplying the number of ABR cells output during the predetermined period by a predetermined constant to give the AOB value.

11. An ATM network switch comprising transmitting means and receiving means associated with an external data link to the switch, and memory means connected to the transmitting means and to the receiving means, and wherein the transmitting means is arranged to write to the memory means congestion data contained in Resource Management (Rm) cells being transmitted by the transmitting means and the receiving means is arranged to read the said data from the memory means and to modify in accordance with the said data congestion data contained in reverse Rm cells arriving at the receiving means from the external data link.

12. A switch according to claim 11, wherein the memory means comprises a dual-ported Random Access Memory.

13. A method according claim 2, comprising multiplying the number of ABR cells output during the predetermined period by a predetermined constant to give the AOB value.

14. A method according to claim 3, comprising multiplying the number of ABR cells output during the predetermined period by a predetermined constant to give the AOB value.

15. A method according to claim 4, comprising multiplying the number of ABR cells output during the predetermined period by a predetermined constant to give the AOB value.

16. A switch according to claim 7, wherein the calculating means comprises means for multiplying the number of ABR cells output during the predetermined period by a predetermined constant to give the AOB value.

17. A switch according to claim 8, wherein the calculating means comprises means for multiplying the number of ABR cells output during the predetermined period by a predetermined constant to give the AOB value.

18. A switch according to claim 9, wherein the calculating means comprises means for multiplying the number of ABR cells output during the predetermined period by a predetermined constant to give the AOB value.

* * * * *